United States Patent
Hvittfeldt et al.

(10) Patent No.: US 6,766,711 B2
(45) Date of Patent: Jul. 27, 2004

(54) INDUSTRIAL ROBOT DEVICE

(75) Inventors: Håkan Hvittfeldt, Västerås (SE); Pierre Mikaelsson, Västerås (SE)

(73) Assignee: ABB AB, Västerås (SE)

( * ) Notice: Subject to any disclaimer, the term of this patent is extended or adjusted under 35 U.S.C. 154(b) by 103 days.

(21) Appl. No.: 10/203,425

(22) PCT Filed: Feb. 7, 2001

(86) PCT No.: PCT/SE01/00227
§ 371 (c)(1),
(2), (4) Date: Sep. 26, 2002

(87) PCT Pub. No.: WO01/60571
PCT Pub. Date: Aug. 23, 2001

(65) Prior Publication Data
US 2003/0121350 A1 Jul. 3, 2003

(30) Foreign Application Priority Data
Feb. 10, 2000 (SE) .............................................. 0000420

(51) Int. Cl.[7] .............................................. B25J 17/00
(52) U.S. Cl. .............................. 74/490.05; 74/490.03; 901/16; 901/23; 901/28
(58) Field of Search ......................... 74/490.01, 490.03, 74/490.05; 901/14, 15, 16, 23, 27, 28

(56) References Cited
U.S. PATENT DOCUMENTS

| 3,916,701 A | * | 11/1975 | Butler ........................... 74/57 |
| 4,407,625 A | * | 10/1983 | Shum ........................... 414/728 |
| 4,976,582 A | | 12/1990 | Clavel |
| 5,562,393 A | * | 10/1996 | Focke et al. ................ 414/626 |
| 5,690,315 A | | 11/1997 | Thomas |
| 5,740,699 A | * | 4/1998 | Ballantyne et al. ...... 74/490.06 |
| 5,771,748 A | | 6/1998 | Genov et al. |
| 5,813,287 A | * | 9/1998 | McMurtry et al. ....... 74/490.06 |
| 5,931,098 A | * | 8/1999 | Bates ........................... 101/484 |
| 6,145,405 A | * | 11/2000 | McMurtry et al. ....... 74/490.07 |
| 6,330,837 B1 | * | 12/2001 | Charles et al. ........... 74/490.06 |
| 6,648,583 B1 | * | 11/2003 | Roy et al. ................... 414/735 |

* cited by examiner

Primary Examiner—David Fenstermacher
(74) Attorney, Agent, or Firm—Venable LLP; Eric J. Franklin

(57) ABSTRACT

The present invention concerns an industrial robot according to the delta concept with an arm system (2) intended for rotation in space that comprises a base section (4), a movable plate (6), several jointed struts (8) and a telescopic shaft (10, 40) arranged between the base section and the movable plate, in which opposite ends (12, 14) of the struts and the telescopic shaft are connected to the base section and to the movable plate, respectively, and in which the telescopic shaft (10, 40) comprises a first telescopic arm (16, 46) and a second telescopic arm (18, 48) that are arranged longitudinally displaceable relative to each other, that each telescopic arm (16, 18; 46, 48) comprises at least two rods (20, 22; 50, 52) that are attached to holders (24–27; 54–57) at their respective end sections. The present invention also includes a method and an application.

11 Claims, 4 Drawing Sheets

INDUSTRIAL ROBOT DEVICE

This application is a 371 of PCT/SE01/00227 filed Feb. 7, 2001.

TECHNICAL AREA

The present invention concerns an industrial robot according to the delta concept with an arm system. The present invention also relates to an application of a telescopic shaft for an industrial robot according to the delta concept. The present invention also relates to a method for an industrial robot according to the delta concept with an arm system intended for rotation in space.

THE PRIOR ART

The use of industrial robots for flexible automation of processes within industry has become ever more common in order to replace time-consuming, monotonous and difficult tasks. One such task, for example, could be the sorting of chocolate pieces or similar objects from a conveyor belt to predetermined places in, for example, cartons, where the objects move on a separate conveyor belt, at a certain speed. In general, the ability to handle small and fragile objects efficiently with high precision and at high speed is in heavy demand for the automation of industrial processes. An industrial robot for this application, among other applications, has been constructed according to what is known as the "delta concept". This type of robot, known as a "delta robot", can, for example, be placed into a frame construction over a conveyor belt, and has an arm system and a tool attached to it that is intended for rotation in space, that is, a rotation with three degrees of freedom along the x, y and z directions. The rotation of the robot arm described hereunder is intended to describe the performance of a rotational movement by the robot arm. The arm system normally comprises a base section and a movable plate and there between three arms formed from a number of jointed struts. The movable plate that is connected to the struts is moved parallel to the base plate, whereby the movable plate always has the same orientation and tilt as the base plate. This is important for the orientation of a gripping means that is connected to the movable plate. It is principally the struts that bear the load. A telescopic shaft, also known as a "fourth shaft", is arranged between the base section and the movable plate. The function of this shaft is to work as a driving shaft from a motor in the base section to a tool connected to the movable plate. The rotation must have minimal play and it must be possible to carry out the rotation in space, that is, the distance from the movable plate to the base of the robot, the base section, is variable. The linear motion may have a speed of up to 10 m/s. The number of pick-ups of objects can be 120 per minute, which is equivalent to two objects per second. Furthermore, this delta robot is usually equipped with a system that visually identifies the objects and only selects those that are perfect.

One problem with this robot is that friction and play between component parts arise during rotational movements with the arm system. At the same time as the telescopic shaft is to increase/decrease in length, it must also be able to transfer relatively large torques with high precision, at high speed/acceleration, independently of whether the objects that are to be picked up are placed on a conveyor belt, randomly or placed in determined positions. On known telescopic shafts for industrial robots according to the delta concept, an inner shaft is stored in an outer tube with an ordinary sliding bearing, in the form of, for example, "splines" or similar means. This gives play in the transfer of torque and it cannot cope with a higher torque than 0.5 Nm at moderate speeds.

Industrial robots according to the delta concept are used in, for example, the foodstuffs industry, medical science, and in other areas in which environmental and health controls are very strict. The requirements for cleanliness on all process equipment in these sensitive environments are high. One problem with the use of an ordinary telescopic shaft, that is, of the general type in which an inner shaft is stored in an outer tube that is longitudinally displaceable, is that there are spaces that are difficult to clean where dirt and bacterial can easily congregate. An ordinary telescopic shaft, comprising, among other things, bearings and bushes, is also sensitive for cleaning such as rinsing with water.

An industrial robot according to the delta concept with an arm system is previously known through U.S. Pat. No. 4,976,582, which robot comprises a telescopic shaft. This patent document generally describes one so-called "delta robot", which has an arm system and a tool connected to it that is intended for rotation in space, that is, a rotation with three degrees of freedom along the x, y and z directions. The arm system comprises a base section, a movable plate, and several jointed struts between the base section and the plate.

DESCRIPTION OF THE INVENTION

The present invention aims to achieve a device for an industrial robot, which device allows cleaning with water, is simpler to clean than conventional constructions and has minimal spaces in which dirt and bacteria can congregate. A further aim of the invention is to allow play-free displaceable torque transfering motions with low friction for a telescopic arm on such a robot. One aim of the present invention is thus to be able to carry out with an arm system for an industrial robot a rotational movement that is free of play in space, with minimal friction and with maximal stiffness. The rotational movement is to be possible at high speeds and accelerations, and with relatively large torques.

The solution is achieved with an industrial robot having the characteristics given in claim 1. To be more precise, the present invention concerns according to claim 1 an industrial robot according to the delta concept with an arm system intended for rotation in space, which arm system comprises a base section, a movable plate, several jointed struts and a telescopic shaft arranged between the base section and the movable plate. Opposite ends of the struts and the telescopic shaft are connected to the base section and the movable plate, respectively. The telescopic shaft comprises a first telescopic arm and a second telescopic arm, which arms are arranged longitudinally displaceable relative to each other. The first telescopic arm comprises at least two rods, one inner holder to which the inner ends of the rods are fixed attached, and one outer holder, to which the outer ends of the rods are fixed attached. The second telescopic arm comprises at least two rods, one inner holder to which the inner ends of the rods are fixed attached, and one outer holder, to which the outer ends of the rods are fixed attached. The inner holder of the first telescopic arm comprises slots in which the rods of the second telescopic arm run. The inner holder of the second telescopic arm comprises slots in which the rods of the first telescopic arm run.

One advantage of the present invention is that it can be easily and rapidly cleaned independently of its position (rinsed with water), since the telescopic arm comprises easily accessible spaces and components that are not damaged by cleaning. At the same time, a very torsionally stiff construction is achieved, in which a telescopic shaft with play-free parallel movement that transfers torque and has low friction is obtained. The construction copes with high torques, greater than 1 Nm, and linear speeds up to 10 m/s. A further advantage is that friction and play are minimised, whereby the robot can carry out rotational movements at high speed and with high precision.

The telescopic shaft is arranged to carry out a rotational movement. The rods are arranged eccentrically, and they are displaced parallel at the telescopic arms relative to the rotation axis of the telescopic shaft, which means that the load on bearings is lower than that in an ordinary telescopic arm (in which an outer tube is stored in an inner shaft that is longitudinally displaceable within the outer tube). The reduced load according to the present invention depends on the transfer of the forces out to the eccentrically arranged rods, compared to an ordinary telescopic shaft in which the forces act centrally around the rotation axis.

Each telescopic arm comprises are least two parallel rods. Each rod is fixed arranged at its end sections to holders. It is appropriate if the holders, which can also be termed "plates", or similar, are disk-shaped. Thus, the holders can have a circular, elliptical, square or an irregular shape. The thickness of the holders in an axial direction, that is, parallel to the direction of extension of the telescopic shaft, can be considerably less than the average diameter of the holder (in the radial direction). However, the holders must have sufficient thickness and stiffness in order to ensure that the rods are attached to the holders in a manner that is rigid with respect to bending. According to one embodiment, however, the inner holders, in particular, can have a significant extension in length, whereby they form a sleeve-shaped body. The outer holders on each telescopic arm constitute the respective ends of the telescopic shaft, and the ends are fixed arranged to the base section and to the movable plate of the robot, respectively. The inner holder of the first telescopic arm and the inner holder of the second telescopic arm comprise through slots, which can also be termed "holes", "through penetrations", or similar, that are arranged for the most part parallel to the direction of extension of the telescopic shaft. On each disk-shaped surface of the holders, the slots open out into an opening. In slots in the inner holder of one of the telescopic arms is a rod from the other telescopic arm arranged in a displaceable way, and vice versa. Thus, the rods of the first telescopic arm are arranged moveable relative to the rods of the second telescopic arm in these slots in the inner holder. In this way, the inner holder of one of the telescopic arms will glide along the rods of the second telescopic arm, and vice versa, during compression or extension of the telescopic shaft.

According to one preferred embodiment of the present invention, at least one bush is arranged in each slot in the holder of the first telescopic arm, which can also be termed as a "linear glide-bearing bush" or just "bearing", in which respective slot the rods of the second telescopic arm are displaceably stored. A bush is arranged in an equivalent manner in each slot of the holder of the second telescopic arm, in which respective slot the rods of the first telescopic arm are displaceably stored. The bush may be formed from any freely chosen material, but it is appropriate if it is formed from a plastic material, which gives minimal friction. It is appropriate if the bush is designed in the form of a sleeve or similar, and makes contact with the wall surfaces of the slot. A bush may be fixed or movably arranged in the slots. If the bush is movably arranged in the slots, this means that it is allowed to turn radially in a slot. It is appropriate if the extent in length of the bush essentially agrees with the extent in length of a slot through the holder. On the other hand, several bushes can be arranged in one slot, for example a bush can be arranged from each side of a slot in the holder.

The slots, including the bushes that are arranged in them, have a diameter that is only insignificantly larger than the rod that is passed through the slot, such that minimal friction and play arise when the rod is pushed backwards and forwards in the slot. Since the holders have a relatively small thickness, the pathway of the passage of the slot through the inner holders is short. This means that there are small contact surfaces between the rods and the slots, particularly in relationship to the edges of the slots. In the case in which the holders are sleeve-shaped and have a significantly longer extent in length, the pathway for the passage of the slot though the inner holders will be longer. In this case, the stretch over which the bushes operate will be longer.

The parts of the telescopic shaft, the first telescopic arm and the second telescopic arm together with the rods that comprise them can, through the present invention, move essentially parallel relative to each other. The telescopic arm are prevented from rocking and exerting a breaking [buckling?] force on the bush.

The number of rods for each telescopic arm may vary, but it must be at least two in order to give sufficient torsional stiffness and symmetry. According to one preferred embodiment, each telescopic arm comprises three rods, which gives a very high torsional stiffness. The telescopic arms may also comprise more than three rods. The rods specified hereunder for the telescopic arms may also be termed, for example, "struts", "tubes", or similar. Each rod may have a varying cross-section, for example, square, elliptical or circular. The rods may be tube-shaped and in this way include a central cavity. The cross-section of the rods is preferably circular, which minimises the risk of the "chest of drawers" effect, that is, the rods are held fixed or bind when obliquely placed during passage through the slots. Each rod has a diameter that is significantly smaller than the diameter of the telescopic shaft.

The present invention also includes a method for an industrial robot according to the delta concept with an arm system intended for rotation in space, whereby a base section and a movable plate are arranged in the arm system. Several jointed struts and a telescopic shaft are arranged between the base section and the movable plate. The opposite ends of the struts and the telescopic shaft are connected to the base section and the movable plate, respectively. The telescopic shaft comprises a first telescopic arm and a second telescopic arm that are arranged to be displaced in a longitudinal direction relative to each other. The first telescopic arm is arranged to comprise at least two rods, one inner holder, to which the inner ends of the rods are fixed attached, and an outer holder to which the outer ends of the rods are fixed attached. The second telescopic arm is arranged to comprise at least two rods, an inner holder, to which the inner ends of the rods are fixed attached, and an outer holder, to which the outer ends of the rods are fixed attached. The inner holder of the first telescopic arm is arranged to comprise slots, in which the rods of the second telescopic arm are arranged to run. The inner holder of the second telescopic arm is arranged to comprise slots, in which the rods of the first telescopic arm are arranged to run.

The present invention also includes an application of the said telescopic shaft, according to the above-mentioned device or method, within the foodstuffs industry or within medical science.

The industrial robot that has been described, which may also be termed "manipulator" or "control device", is, according to the present invention, of a type intended to be able to carry loads of up to at least 1 kg.

For a general description of an arm system for an industrial robot according to the delta concept, reference is made to U.S. Pat. No. 4,976,582 (and in particular, column 2, lines 15–31; column 3, line 27—column 4, line 7).

DESCRIPTION OF DRAWINGS

The invention will now be described in more detail in the form of a non-limiting embodiment according to the present invention, made visible with the aid of the attached drawings, where.

DESCRIPTION OF EMBODIMENTS

Figure 1:
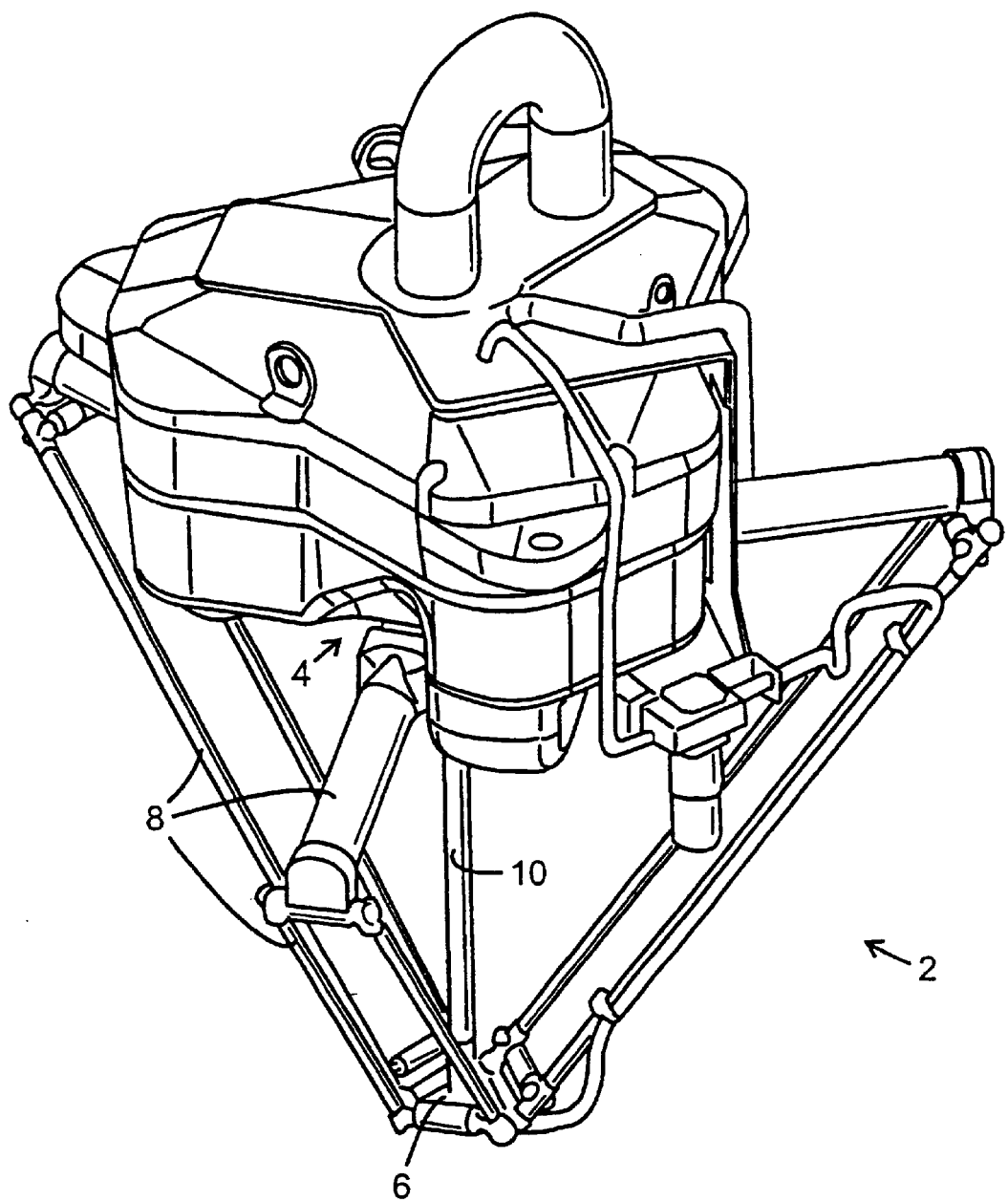
FIG. 1 shows a perspective view of an industrial robot according to the delta concept.

FIG. 1 shows an industrial robot according to the delta concept. The industrial robot is designed with an arm system 2 designed for rotation in space. Several jointed struts 8 are at one of their end parts attached to a movable plate 6. The jointed struts are at their opposite ends attached to a, generally denoted, base section 4 of the robot. A tool is to be arranged on the movable plate 6. The movable plate is allowed a movement in space with constant orientation and constant tilt. A fourth shaft, in the form of a telescopic shaft 10, is arranged between the base section and the movable plate, where opposite ends of the telescopic shaft 12, 14 (see FIG. 2) and of the struts 8 are connected to the base section and to the movable plate, respectively. The task of the telescopic shaft is to serve as a driving shaft from a motor in the robot structure to a tool arranged on the movable plate. The telescopic shaft is at one end stationary connected to the base section 4 and freely movable at the other end since it is connected to the movable plate 6. The complete telescopic shaft can swing forwards and backwards at a very high speed. The rotation is carried out in space, that is, the distance from the movable plate 6 to the base of the robot, the base section 4, can be changed.

Figure 2:
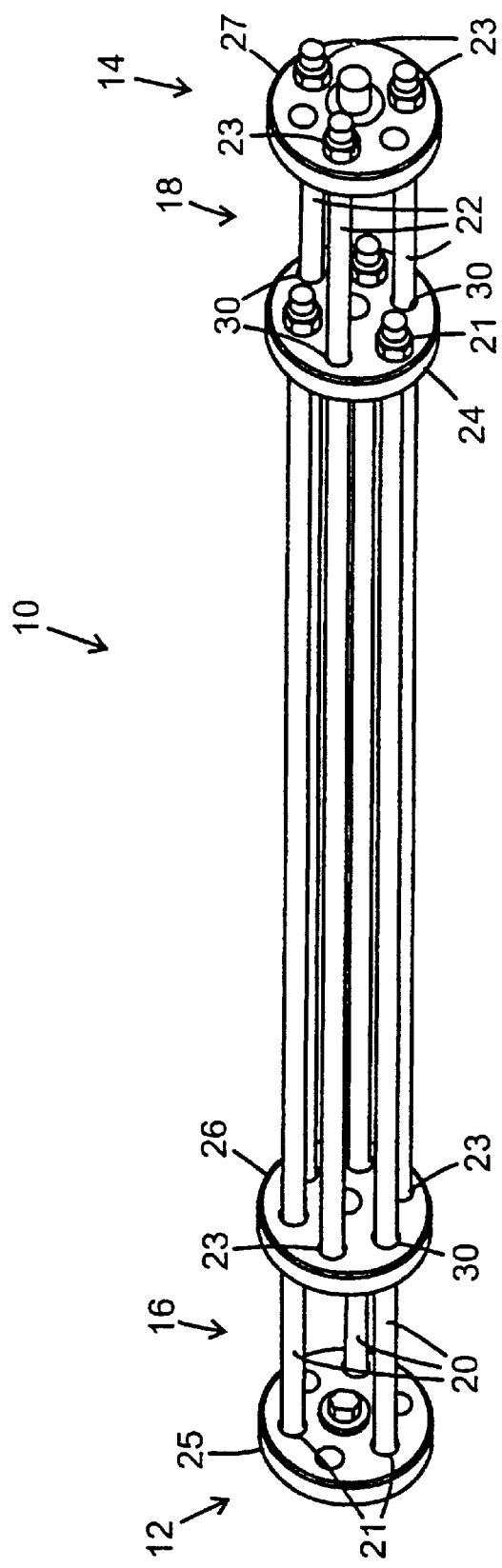
FIG. 2 shows a telescopic shaft for an industrial robot.

A telescopic shaft 10 is shown in perspective view in FIG. 2, and comprises a first telescopic arm 16 and a second telescopic arm 18, which arms are arranged to be longitudinally displaceable relative to each other. Each telescopic arm 16, 18 comprises three rods, 20, 22 that are fixed at their respective end parts to holders 24, 25, 26, 27. The first telescopic arm 16 comprises an inner holder 24 and an outer holder 25 into which respective holders 24, 25 the rods 20, 21 are fixed. The second telescopic arm 18 comprises an inner holder 26 and an outer holder 27 into which respective holders 26, 27 the rods 22 are fixed 23. The inner holder 24 of the first telescopic arm 16 and the inner holder 26 of the second telescopic arm 18 comprise slots 30, in which the rods 20 of the first telescopic arm 16 and the rods 22 of the second telescopic arm 18 are displaceably arranged. A bush is arranged in each slot 30 in the inner holders 24, 26 of the telescopic arms. The more the telescopic shaft 10 is compressed, that is, the greater the distance is between the inner holders 24, 26, the greater is the stiffness exhibited by the telescopic shaft 10. An increase in distance between the inner holders 24, 26 also means that the distance between the bushes on the inner holder 24 increases with respect to the bushes on the second inner holder 26. A torsional movement of, for example, the first telescopic arm 16, is transferred to the inner telescopic arm 18. The rods 20, 22 of the respective telescopic arm transfer a pressure at the edge of a hole in the slots 30 of the respective holder 24, 26 during torsional movement.

Figure 3A:
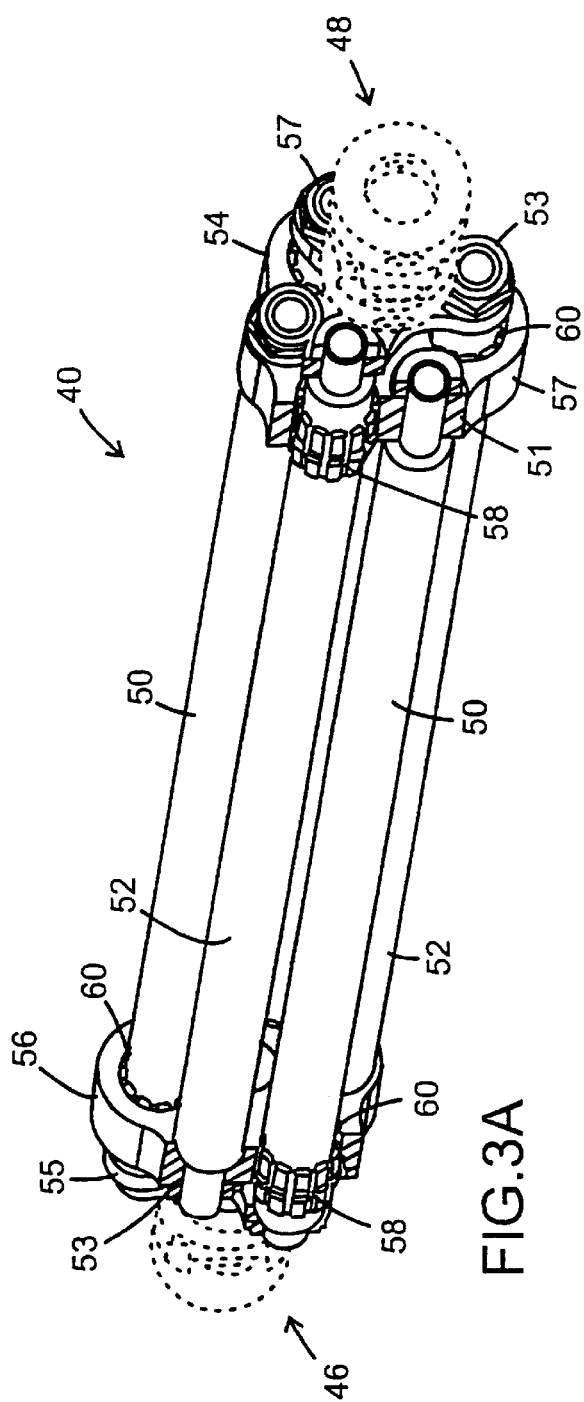
FIG. 3A illustrates in a partially sectioned perspective view an alternative embodiment of a telescopic shaft.
Figure 3B:
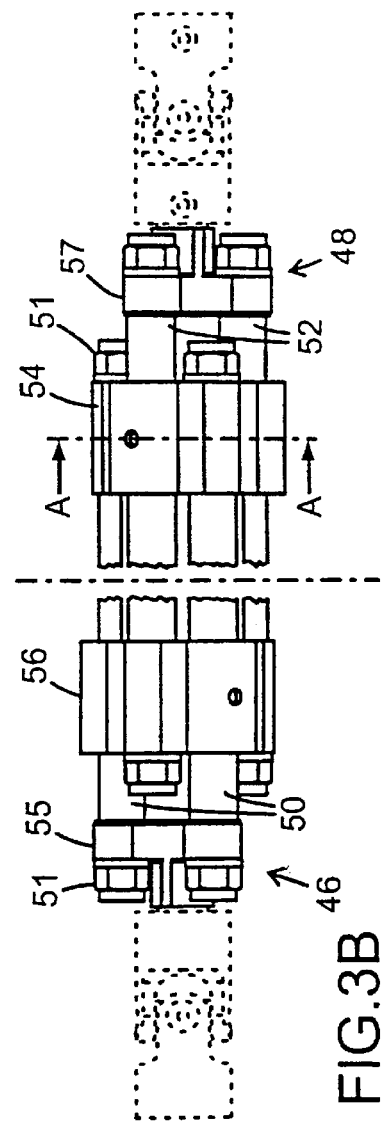
FIG. 3B illustrates the telescopic shaft in FIG. 3A in a view directly from the side.
Figure 3C:
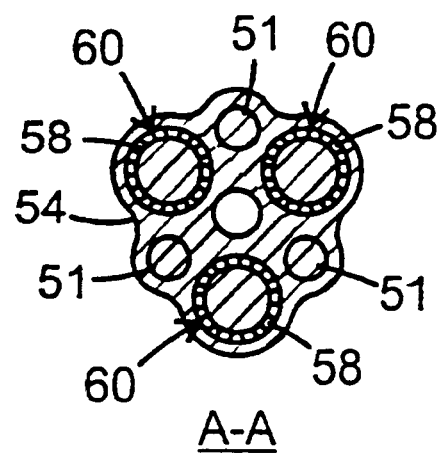
FIG. 3C shows a cross-section through A—A of the telescopic shaft in FIG. 3B.

FIGS. 3A–3C illustrate an alternative embodiment of a telescopic shaft 40 (which mainly agrees with the telescopic shaft that is shown in FIGS. 1 and 2). The telescopic shaft 40 comprises a first telescopic arm 46 and a second telescopic arm 48, which are arranged to be longitudinally displaceable relative to each other. Each telescopic arm 46, 48 comprises three rods, 50, 52 that are fixed at their respective end parts to holders 54, 55, 56, 57. The first telescopic arm 46 comprises an inner holder 54 and an outer holder 55 into which respective holders 54, 55 the rods 50, 51 are fixed arranged. The second telescopic arm 48 comprises an inner holder 56 and an outer holder 57 into which respective holders 56, 57 the rods 52, 53 are fixed arranged. The inner holder 54 of the first telescopic arm 46 and the inner holder 56 of the second telescopic arm 48 comprise slots 60. A bush 58 is arranged in each slot 60 in the inner holders 54, 56 of the telescopic arms, which bush functions as a linear sliding bearing bush. The rods 50, 52 of the telescopic arms 46, 48 are displaceably stored in the respective slots 60.

Figure 3D:
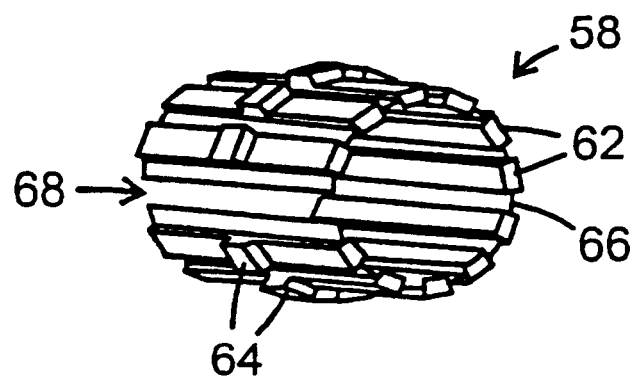
FIG. 3D illustrates in a perspective view the bush shown in FIGS. 3A and 3C.

FIG. 3D shows the bush 58 according to FIGS. 3A and 3C. The bush 58 comprises axially extended ribs 62 that have a central elevated part 64, a boss, ridge or similar, arranged radially and positioned on the outer surface of the bush. This elevated part 64 is intended to be arranged in a track, formed in the inner walls of the slots 60 in the holders 54, 56, whereby the bush remains in the slots, movable or fixed arranged, despite load and friction from the rods 50, 52 that pass through. A central wall 66 is arranged between two parallel ribs 62, which holds the ribs together to form a sleeve or similar. It is appropriate if the bush lacks a central wall at one section around its perimeter, whereby two of the ribs are not connected and can thus be opened. Thus the sheath has an open section 68, such that it easily can be compressed somewhat, and drawn out from a slot without any extensive disassembly of the holder or the telescopic arm.

What is claimed is:

1. An industrial robot according to the delta concept with an arm system (2) intended for rotation in space that comprises a base section (4), a movable plate (6), several jointed struts (8) and a telescopic shaft (10, 40) arranged between the base section and the movable plate, in which opposite ends (12, 14) of the struts and the telescopic shaft are connected to the base section and to the movable plate, respectively, in which the telescopic shaft (10, 40) comprises a first telescopic arm (16, 46) and a second telescopic arm (18, 48) that are arranged longitudinally displaceable relative to each other, characterised in that the first telescopic arm (16, 46) comprises at least two rods (20, 50), an inner holder (24, 54), to which the inner ends of the rods are fixed attached, and an outer holder (25, 55) to which the outer ends of the rods are fixed attached, that the second telescopic arm (18, 48) comprises at least two rods (22, 52), an inner holder (26, 56) to which the inner ends of the rods are fixed attached, and an outer holder (27, 57) to which the outer ends of the rods are fixed attached, that the inner holder (24, 54) of the first telescopic arm (16, 46) comprises slots (30, 60) in which the rods of the second telescopic arm (18, 48) run, and that the inner holder (26, 56) of the second telescopic arm (18, 48) comprises slots (30, 60) in which the rods (20, 50) of the first telescopic arm (16, 46) run.

2. The industrial robot according to claim 1, characterised in that each telescopic arm (16, 18; 46, 48) comprises three rods (20, 22; 50, 52).

3. The industrial robot according to claim 1, characterised in that a bush (58) is arranged in each slot (30, 60) in the holders of the telescopic arms (24–27; 54–57) in which respective slot the rods (20, 22; 50, 52) of the telescopic arms are displaceably stored.

4. The industrial robot according to claim 3, characterised in that the bush (58) comprises parallel ribs (62) that form a sleeve.

5. The industrial robot according to claim 3, characterised in that the bush (58) is displaceably arranged in a slot (30, 60).

6. The industrial robot according to claim 3, characterised in that the bush (58) has one open section (68).

7. The industrial robot according to claim 1, characterised in that the rods (20, 22; 50, 52) have a circular cross-section.

8. The industrial robot according to claim 1, characterised in that the rods are arranged to be displaced in a direction mainly parallel to each other.

9. The application of a telescopic shaft (10, 40) according to the device in claim 1 within the foodstuffs industry or within medical science.

10. A method for an industrial robot according to the delta concept with an arm system (2) intended for rotation in space, whereby a base section (4) and a movable plate (6) are arranged in the arm system, in which several jointed struts (8) and a telescopic shaft (10, 40) are arranged between the base section and the movable plate, in which opposite ends of the struts (8) and the telescopic shaft (10, 40) are connected to the base section and to the movable plate, respectively, and in which the telescopic shaft (10, 40) comprises a first telescopic arm (16, 46) and a second telescopic arm (18, 48) that are arranged to be displaced in the longitudinal direction relative to each other, characterised in that the first telescopic arm (16, 46) is arranged to comprise at least two rods (20, 50), an inner holder (24, 54), to which the inner ends of the rods are fixed attached, and an outer holder (25, 55) to which the outer ends of the rods are fixed attached, that the second telescopic arm (18, 48) is arranged to comprise are least two rods (22, 52), an inner holder (26, 56) to which the inner ends of the rods are fixed attached, and an outer holder (27, 57) to which the outer ends of the rods are fixed attached, that the inner holder (24, 54) of the first telescopic arm (16, 46) is arranged to comprise slots (30, 60) in which the rods of the second telescopic arm (18, 48) are arranged to run, and that the inner holder (26, 56) of the second telescopic arm (18, 48) is arranged to comprise slots (30, 60) in which the rods (20, 50) of the first telescopic arm (16, 46) are arranged to run.

11. The application of a telescopic shaft (10, 40) according to the method according to claim 10 within the foodstuffs industry or within medical science.

* * * * *